(12) United States Patent  
Siddiqui

(10) Patent No.: US 12,354,610 B1  
(45) Date of Patent: Jul. 8, 2025

(54) USER IDENTIFICATION USING VOICE CHARACTERISTICS

(71) Applicant: Amazon Technologies, Inc., Seattle, WA (US)

(72) Inventor: Ahmed Fuad Siddiqui, Everett, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 81 days.

(21) Appl. No.: 18/118,491

(22) Filed: Mar. 7, 2023

Related U.S. Application Data

(60) Division of application No. 16/383,011, filed on Apr. 12, 2019, now Pat. No. 11,605,389, which is a continuation of application No. 15/132,184, filed on Apr. 18, 2016, now Pat. No. 10,262,661, which is a continuation of application No. 13/890,151, filed on May 8, 2013, now Pat. No. 9,317,736.

(51) Int. Cl.
| | |
|---|---|
| G10L 17/22 | (2013.01) |
| G06F 16/2457 | (2019.01) |
| G06V 40/16 | (2022.01) |
| G10L 17/00 | (2013.01) |
| G10L 17/06 | (2013.01) |
| G10L 25/54 | (2013.01) |
| H04L 61/4594 | (2022.01) |
| H04M 1/27453 | (2020.01) |
| H04M 1/72457 | (2021.01) |

(52) U.S. Cl.  
CPC ........ *G10L 17/22* (2013.01); *G06F 16/24578* (2019.01); *G06V 40/16* (2022.01); *G06V 40/172* (2022.01); *G10L 25/54* (2013.01); *H04L 61/4594* (2022.05); *H04M 1/27453* (2020.01); *H04M 1/72457* (2021.01)

(58) Field of Classification Search  
USPC .......................................................... 704/246  
See application file for complete search history.

(56) References Cited

U.S. PATENT DOCUMENTS

| | | | |
|---|---|---|---|
| 5,606,644 A | 2/1997 | Chou et al. | |
| 6,073,101 A * | 6/2000 | Maes .................... | G10L 15/065 704/E17.011 |
| 6,107,935 A | 8/2000 | Comerford et al. | |
| 6,477,500 B2 | 11/2002 | Maes | |
| 6,615,172 B1 | 9/2003 | Bennett et al. | |

(Continued)

*Primary Examiner* — Ishrat I Sherali  
(74) *Attorney, Agent, or Firm* — K&L Gates LLP

(57) ABSTRACT

Embodiments of methods, systems, and storage medium associated with providing user records associated with characteristics that may be used to identify the user are disclosed herein. In one instance, the method may include obtaining features of an individual, determining identifying characteristics associated with the obtained features, and initiating a search for a record associated with the individual based in part on the identifying characteristics associated with the obtained features, and, based on a result of the search, a verification of the record associated with the individual. The method may further include receiving at least a portion of the record associated with the individual, based at least in part on a result of the verification. The verification may be based in part on a ranking associated with the record. Other embodiments may be described and/or claimed.

20 Claims, 8 Drawing Sheets

(56) References Cited

U.S. PATENT DOCUMENTS

| | | |
|---|---|---|
| 7,092,018 B1 | 8/2006 | Watanabe |
| 7,266,224 B2 | 9/2007 | Sukegawa |
| 7,751,597 B2 * | 7/2010 | Gabara .................. G10L 17/00 |
| | | 382/116 |
| 7,804,982 B2 | 9/2010 | Howard et al. |
| 7,949,156 B2 | 5/2011 | Willis |
| 8,775,187 B2 * | 7/2014 | Summerfield .......... G06F 21/32 |
| | | 704/273 |
| 8,798,995 B1 | 8/2014 | Edara |
| 8,812,319 B2 | 8/2014 | Skerpac |
| 8,977,555 B2 | 3/2015 | Torok et al. |
| 9,317,736 B1 | 4/2016 | Siddiqui |
| 9,401,140 B1 | 7/2016 | Weber et al. |
| 9,456,070 B2 * | 9/2016 | Li ........................ H04M 1/656 |
| 9,520,129 B2 | 12/2016 | Nagatomo |
| 9,886,948 B1 | 2/2018 | Garimella et al. |
| 9,972,324 B2 | 5/2018 | Polehn et al. |
| 10,262,661 B1 * | 4/2019 | Siddiqui ............. G06V 40/172 |
| 10,902,001 B1 | 1/2021 | Rengasamy et al. |
| 11,605,389 B1 * | 3/2023 | Siddiqui .............. G06V 40/172 |
| 2002/0002465 A1 * | 1/2002 | Maes .................... G10L 15/065 |
| | | 704/E17.011 |
| 2003/0154072 A1 * | 8/2003 | Young .................... G06F 16/40 |
| | | 704/E15.045 |
| 2004/0008873 A1 | 1/2004 | Sogo et al. |
| 2004/0044952 A1 | 3/2004 | Jiang et al. |
| 2006/0171571 A1 | 8/2006 | Chan et al. |
| 2008/0049983 A1 | 2/2008 | Miller et al. |
| 2008/0112598 A1 | 5/2008 | Gabara |
| 2009/0287489 A1 | 11/2009 | Savant |
| 2011/0035406 A1 | 2/2011 | Petrou et al. |
| 2011/0050501 A1 * | 3/2011 | Aljadeff ................. G01S 5/06 |
| | | 342/387 |
| 2011/0224986 A1 * | 9/2011 | Summerfield .......... G10L 17/12 |
| | | 704/E17.001 |
| 2013/0033611 A1 | 2/2013 | Chen |
| 2013/0158999 A1 | 6/2013 | Maruta et al. |

\* cited by examiner

USER IDENTIFICATION USING VOICE CHARACTERISTICS

CROSS-REFERENCE TO RELATED APPLICATION

This application is a divisional of U.S. patent application Ser. No. 16/383,011 filed on Apr. 12, 2019 which is a continuation of U.S. patent application Ser. No. 15/132,184 filed Apr. 18, 2016 now U.S. Pat. No. 10,262,661 issued on Apr. 16, 2019 which is a continuation of U.S. patent application Ser. No. 13/890,151 filed May 8, 2013 now U.S. Pat. No. 9,317,736 issued on Apr. 19, 2016. The disclosure of these applications is herein incorporated by reference in its entirety and for all purposes.

BACKGROUND

Many mobile computing devices today have the ability to capture an image or other feature associated with a person, such as a photograph, video, voice sample, and the like. The captured features, such as images may be stored locally on the device or remotely and made accessible by the device. Some image viewing applications available today organize the captured images by objects in the image, for example, by a person captured in the image that may be identified, for example, through facial recognition techniques. However, users of mobile computing devices may not always be able to take advantage of these technologies in real- or near-real time. For example, if a user meets a stranger or a familiar individual whose name she may not remember, typically, the user may have to explicitly ask for the individual's name, which may be somewhat awkward in different social situations.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
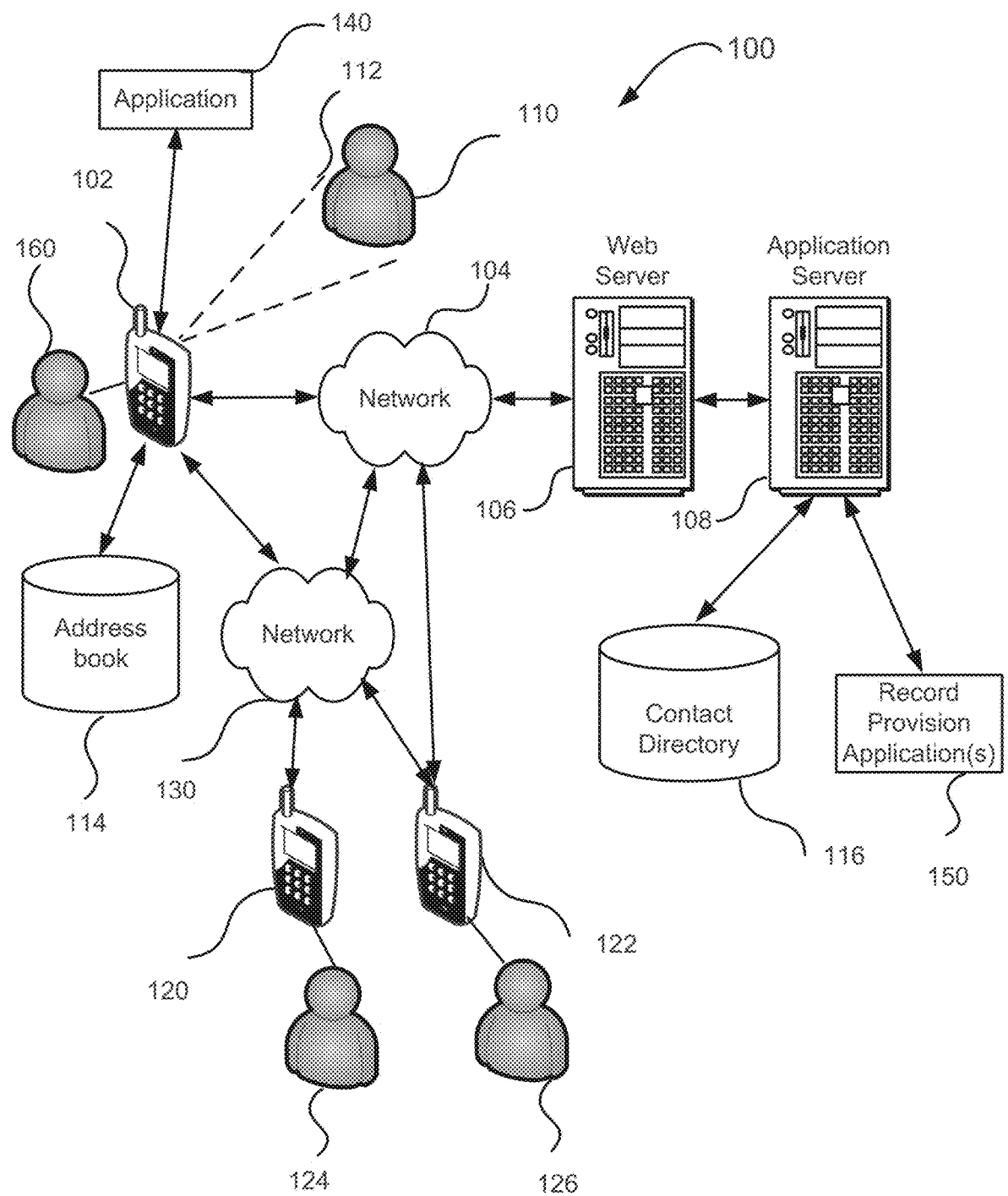
FIG. 1 is a block diagram illustrating an example computing environment for user record provision in accordance with various embodiments.

Techniques described herein provide for requesting and obtaining information (e.g., a record) associated with an individual, based on features obtained by a requesting computing device (e.g., mobile device). The features may be captured via an image recording, video recording, sound recording, or biometric capture for example. In some embodiments, the search for a record may be based on matching image characteristics, such as facial data extracted from an image of an individual, with images of users stored at a storage location (e.g., a contact directory with user images and other contact information) accessible by the computing device. If a match is found (e.g., within a particular match threshold value), at least a portion of the record associated with the matched image and stored at the storage location may be verified and, upon successful verification, provided to the computing device. In some embodiments, the individual's record may include, but may not be limited to, one or more of the following: a name of the individual, a telephone number of the individual, an email address of the individual, an address of the individual, and/or an expiration date of the record. In some embodiments, a record search and verification may be processed by, an electronic entity, such as a server configured to access the storage location, such as contact directory configured to store user records.

For example, a user may take a picture of an individual using her mobile device. The device may extract the image characteristics (e.g., facial data) from the individual's picture. The obtained data may be sent to an electronic entity (e.g., server) associated with the storage location that stores contact information of the users, such as a contact directory. The electronic entity may search in the contact directory for a record with matching characteristics. If the matching record is found, the record (or portion thereof) may be provided to the user's mobile device, in some embodiments, with the individual's permission, after the record verification is successfully completed.

In another example, the user may take a picture of a group of individuals using her mobile device. The image characteristics of each individual on the picture may be extracted and submitted to the electronic entity for search of the matching records. If at least some of the matching records are found, the records may be provided to the user's mobile device. The mobile device may initiate requests to the identified individuals, in some embodiments, with user's approval, in order to have the individual's permissions that their record (or portions thereof) be added to the user's address book that may be residing on the mobile device.

Verification of the record may be based on a ranking assigned to the record stored in the contact directory. The ranking may be assigned based on, among other factors, a number of prior requests to obtain the individual's record, duration of storage of the individual's record, a number of changes occurred in the individual's record during the duration of the record's existence, and/or an amount of data included in the record. At least a portion of the record may be provided to the computing device if a search for the record and verification of the record are successful. The obtained record may be added to an address book accessible by the computing device and associated with a user of the computing device. In some embodiments, the record may be added to the address book upon sending a request to, and receiving an approval by, the individual.

In some embodiments, the record ranking may be updated (e.g., raised or lowered) based on various factors, such as the adding of the record to a user's address book, as described below in greater detail. In some embodiments, contacts whose records are included in the address book or in the contact directory may be identified when they are in a vicinity of the computing device and a corresponding notification may be generated by the computing device (e.g., when the contact is determined to be included in the address book) or provided to the computing device, e.g., by the electronic entity, when the contact is determined to be in the contact directory.

FIG. 1 is a block diagram illustrating an example computing environment 100 for a user record provision in which various embodiments described herein may be implemented. Although a Web-based environment is used for purposes of explanation, different environments may be used, as appropriate, to implement various embodiments. The environment 100 may include a computing device 102, which may be any appropriate device, such as, in some embodiments, a mobile wireless device, a laptop computer, an e-book reader, a tablet, a wearable device, among other possibilities. The computing device 102 may be configured to access an application 140 (in some embodiments, residing on the device 102) that, when executed on the computing device 102, may configure the computing device 102 to obtain and process information representing features (e.g. an image, sound, biometric information, etc.) of a person, e.g., individual 110, extract identifying characteristics based on the obtained features, send requests for additional information associated with the identifying characteristics, receive messages or information about the person over networks 104 and/or 130, and convey the message or information to a user 160 of the computing device 102. In some embodiments, the application 140 may include one or more modules that may include software and/or hardware components configured to perform the functions described herein.

The networks 104 and 130 may include any appropriate network, including an intranet, the Internet, a cellular network, a local or personal area network (e.g., Bluetooth®, near field communication (NFC), or Wi-Fi), or any other such network or combination thereof. The environment 100 may also include a Web server 106 for receiving requests from the application 140 executing on the computing device 102 and serving content in response thereto, although for other networks, an alternative device serving a similar purpose may be used.

The illustrative environment 100 may further include an application server 108 configured to operate a data storage location (contact directory) 116. The application server 108 may include any appropriate hardware and software for integrating with the contact directory 116, for example, to execute one or more record provision application(s) 150 in response to requests provided by application 140 executing on the computing device 102, e.g., via the Web server 106. In some embodiments, the record provision application(s) 150 may include one or more modules that may include software and/or hardware components configured to perform the functions described herein.

The contact directory 116 may be configured to receive instructions from the application server 108 and obtain, update, or otherwise process data in response thereto. The contact directory 116 may be configured to store, for each individual user, user information (record) and one or more features that may be used to identify an individual associated with the record. In some embodiments, the features may include one or more images of the individual. The individual's record may include, but may not be limited to, a name of the individual, a telephone number of the individual, an email address of the individual, an address of the individual, and/or an expiration date of the record. In some embodiments, at a minimum, the record may include a name of the individual that may be shared with other users.

In some embodiments, the computing device 102 may obtain an image of an individual 110. For example, a user 160 of the device 102 may capture 112 the image of the individual 110, e.g., using a camera embedded in the device 102. The application 140 executing on the computing device 102 may process the captured image by extracting some image characteristics, such as facial data. The facial data may be extracted using, for example, known facial recognition algorithms configured to extract features from an image of the face of an individual. For example, such algorithm may analyze the relative position, size, and/or shape of the eyes, nose, cheekbones, and jaw. These features may then be used to search for other images with matching features. In some embodiments, three-dimensional face recognition algorithms may be used to capture information about a shape of the face of the individual. This information may then be used to identify distinctive features on the surface of a face, such as the contour of the eye sockets, nose, and chin, for example.

When the image processing is completed, the application 140 executing on the device 102 may generate a request to provide information associated with the individual. For example, the request may be initiated by the user 160 of the device 102. In some embodiments, the request may include the extracted image characteristics. The request may be communicated, via the network (e.g., Internet) 104 and the Web server 106, to the application server 108 that may be accessible by the record provision application(s) 150 and the contact directory 116. It should be noted that in some embodiments the record provision application(s) 150 and/or the contact directory 116 may execute and/or reside on the device 102. The request then may be communicated to the record provision application(s) 150 residing on the device 102.

The record provision application(s) 150 executing on the application server 108 may initiate a matching of the provided image characteristics to the images stored in the contact directory 116. If a match is found (e.g., using facial recognition techniques), the record provision application(s) 150 executing on the application server 108 may retrieve a record associated with the matched image and verify the record, based at least in part on a ranking assigned to the record. If the record is verified, the record or a portion thereof (depending on a setting associated with the record that may specify what information in the record may be shared with other users) may be provided to the computing device 102. What constitutes "matching" may vary from application to application, depending on the degree of confidence required. In some applications where a higher degree of confidence is required or desired, e.g., in a professional setting, a higher level of similarity may be required of the facial characteristics, whereas, in some applications where a lower degree of confidence is sufficient, e.g., in a casual setting, a lower level of similarity may be used to determine "matching." A level of similarity may be included in factors determining the ranking of the record, such as number of prior requests to obtain the individual's record, duration of storage of the individual's record, a number of changes occurred in the individual's record during the duration of the record's existence, and/or an amount of data included in the record.

The application 140 executing on the computing device 102 may add the provided record to an address book 114 accessible by the computing device. In some embodiments, the address book 114 may be associated with the user 160 of the computing device 102. The record may be added, for example, upon prompting the user 160 to add the record to her address book 114. In another example, the record may be added upon requesting, and receiving, an approval of the individual 110 whose record was requested.

In some embodiments, the record provision application(s) 150 executing on the application server 108 may update (e.g., raise) the individual 110's record's ranking based on the fact that the record of the individual 110 has been added to the address book 114 associated with the user 160. The record provision application(s) 150 executing on the application server 108 may also update (e.g., lower at least for a time period) the ranking of a record of the user 160 associated with the computing device 102 based on the addition of the individual 110's record to the user 160's address book 114. The lowering of the ranking of the user 160's record may reflect the assumption that the user 160, by adding the individual 110's record to her address book, trusted that the individual 110's record is correct and may be worth including in the address book of the user 160. The ranking updates are described in greater detail in reference to FIG. 3.

In some embodiments, the record provision application(s) 150 executing on the application server 108 may update the individual's record by adding the captured features (e.g., image of the individual 110) to the record.

In some embodiments, the computing device 102 may receive a notification about or detect a presence of users 124 and 126 whose records are included in the address book 114 or in the contact directory 116. For example, the computing devices 120 and 122 associated with the users 124 and 126 respectively may broadcast their location to the record provision application(s) 150 executing on the application server 108, e.g., via the network 104. The record provision application(s) 150 may notify the application 140 executing on the computing device 102 about the presence of the devices 120 and 122 in vicinity to the computing device 102. In another example, the computing device 102 may detect the presence of the devices 120 and 122, e.g., via a local area network (Bluetooth®, Wi-Fi, or NFC) 130. The application 140 may then provide a corresponding notification to the user 160 of the computing device 102.

In some embodiments, the users 124 and 126 may be notified of the presence of the user 160 in vicinity of their devices 120 and 122 using similar techniques. In some embodiments, the users 124 and 126 may be notified of the presence of the individual 110 by virtue of the user 160 capturing 112 the identifying features (e.g., image) of the individual 110 and subsequent adding the individual's record to the address book 114. For example, the computing device 102 may send a notification to the devices 120 and 122 in vicinity that the individual 110 whose image has been taken is currently in vicinity to the devices 120 and 122.

Figure 2:
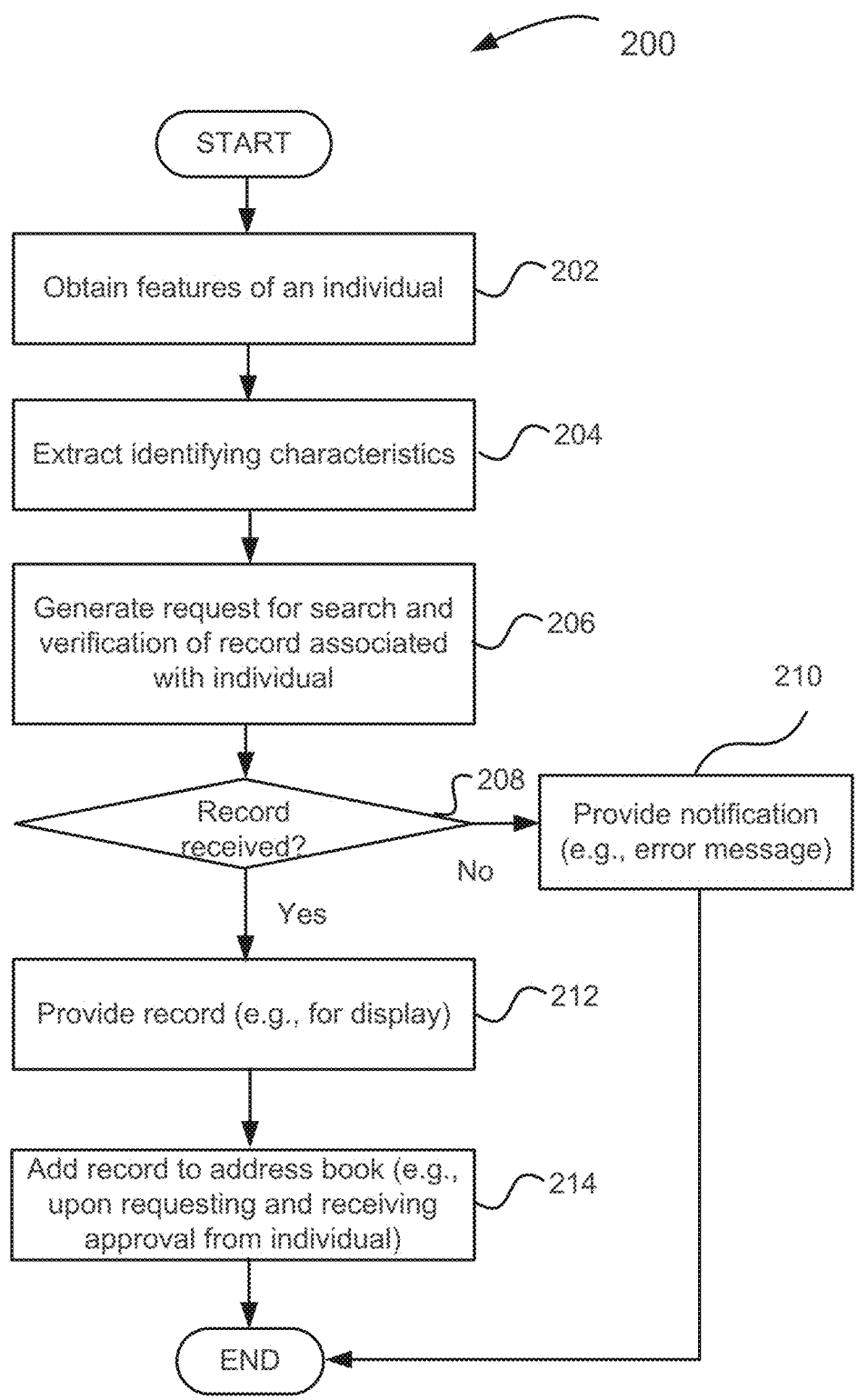
FIG. 2 is a process flow diagram illustrating a process for initiating a search and verification of an individual's record based in part on an obtained image of the individual, in accordance with various embodiments.

FIG. 2 is a process flow diagram illustrating a process 200 for obtaining features of an individual and initiating a search for, and verification of, an individual's record based in part on identifying characteristics obtained from the features of the individual, in accordance with various embodiments. The process 200 may be performed, for example, by the application 140 executing on the computing device 102 as described in reference to FIG. 1. In some embodiments, the application 140 may execute on the application server 108.

The process 200 may begin at block 202, where the application 140 may obtain features (e.g., image) of an individual. The image may be obtained in a number of different ways. In some embodiments, the user 160 of the computing device 102 may capture 112 an image of the individual 110, as described in reference to FIG. 1, in order to request information about the individual 110, for example, individual's name. For example, the user 160 may not remember or may not yet know the individual's name, but would like to know (or be reminded of) the individual's name. In some embodiments, the image may be retrieved from any local or remote storage location accessible by the computing device, such as from an album of pictures taken or otherwise associated with the user 160 that may be residing on the computing device 160 or on the Web, a social networking Web site, a Web-based shared storage facility, and the like.

At block 204, the application 140 may extract identifying characteristics, e.g., one or more characteristics associated with the obtained image. In some embodiments, the application may extract facial data from the image that may be used for a search of a matching image as will be described below. Facial data may include, for example, relative position, size, and/or shape of the eyes, nose, cheekbones, jaw, as well as color of hair, color of eyes, and other facial features.

More generally, the identifying characteristics may include any feature-rich areas of the image that are distinct from other portions of the image. Such distinct features may be, in addition to facial features, or in the alternative, a particular piece of clothing (e.g., a belt buckle, a tie, a hat, a brooch, and the like) or a distinct ornament (e.g., a sign on the person's T-shirt, a flower on the dress, and the like).

In some embodiments, the obtained features may include a video image of an individual. In order to obtain identifying characteristics from a video image, various movement data may be used, such as, for example, common gestures, tics, facial expressions, walk gait, and other peculiarities associated with the individual.

In some embodiments, the obtained features may include a voice sample. In order to obtain identifying characteristics from a voice sample, speaker recognition techniques may be used in order to identify acoustic features of individual's speech, e.g., various acoustic patterns.

At block 206, the application 140 may generate a request for search and verification of a record that may be associated with the obtained identifying characteristics. The request may include the identifying characteristics extracted by the application 104 at block 204. The request may be generated, e.g., upon obtaining the features of an individual and extracting the identifying characteristics. In another example, the application 140 may prompt the user 160 to generate and/or send the request for search and verification. In some embodiments, the request may be directed to the record provision application(s) 150 that may be executing on the application server 108. The record provision application(s) 150 may conduct search for, and verification of, the requested record and return results (if a matching record is found) to the application 140 in response to the request, as described in more detail in reference to FIG. 3.

At decision block 208, the application 140 may determine (e.g., by conducting a response check loop periodically) whether a record or a portion of the record has been received from the record provision application(s) 150 in response to the request provided to the record provision application(s)

150 at block 206. If no record has been received, or, for example, a communication such as an error message has been returned by the record provision application(s) 150 instead of the record when the requested record was not identified), the application 140 may provide a corresponding notification at block 210, e.g., by rendering the notification for display on the computing device 102. If the record has been received, the application 140 may provide the record to the user 160, for example, by rendering the record (or portions thereof) for display on the computing device 102.

At block 214, the application 140 may add the received record to the address book 114 accessible by the computing device 102 and associated with the user 160. In some embodiments, the application 140 may request a permission from the individual 110 to approve the record addition. For example, the application 140 may send an e-mail request to an email address provided in the individual's record or send a short message service (SMS) message to the individual's phone number, or the like. In some embodiments, a notification corresponding to the request may be displayed on a computing device associated with the individual 110 and configured with an application similar to 140.

If the individual responds with an approval of the record addition (e.g., in a manner similar to the request), the application 140 may add, or request that the user 160 approve the addition of the record to the address book 114. In some embodiments, the record may be added to the address book 114 without approval by the individual, depending on permission settings associated with the record and accessible by the record provision application(s) 150, as will be described in greater detail in reference to FIG. 3. In some embodiments, the user 160 of the computing device 102 may decide to add the record to the address book 114 even if the returned record is unverified by record provision application(s) 150, as described in reference to FIG. 3 in greater detail.

Figure 3:
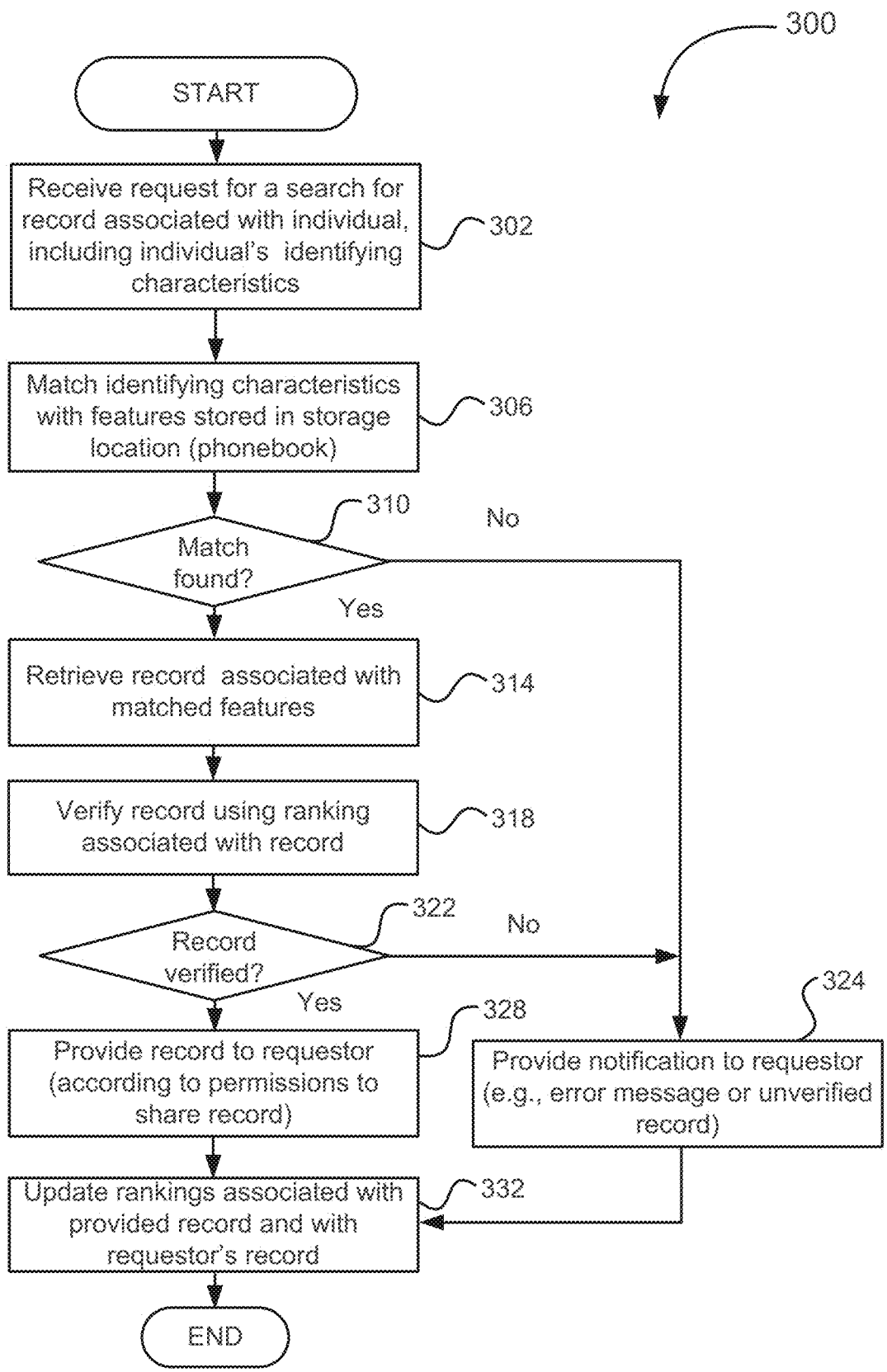
FIG. 3 is a process flow diagram illustrating a process for search and verification of an individual's record based in part on an obtained image of the individual, in accordance with various embodiments.

FIG. 3 is a process flow diagram illustrating a process 300 for search and verification of an individual's record based in response to a request for search and verification provided by the computing device 102 as described in reference to FIG. 2, in accordance with various embodiments. The process 300 may be performed, for example, by the record provision application(s) 150 executing on the application server 108 as described in reference to FIG. 1.

The process 300 may begin at block 302, where the record provision application(s) 150 may receive a request for a search and verification of the record associated with an individual, where the request may include individual's image's characteristics. The request may be provided by the application 140 as described in reference to FIG. 2.

At block 306, the record provision application(s) 150 may conduct a search of an image that may match the provided identifying characteristics. The search may be performed among a plurality of user images stored in the contact directory 116 in association with corresponding records, as described in reference to FIG. 1.

In the example of the image characteristics including face data, the facial areas in the stored images may be analyzed to determine whether the characteristics of the other images (e.g., color of hair, color of eyes, sizes of facial features, etc.) match or are similar to the provided face data, for example, within a particular margin of error. The analysis may employ one or more facial recognition algorithms, such as, for example, Principal Component Analysis, Linear Discriminate Analysis, Elastic Bunch Graph Matching using the Fisherface® algorithm, the Hidden Markov model, the Multilinear Subspace Learning algorithm, the neuronal motivated dynamic link matching, and the like. In the example of the identifying characteristics extracted from other types of features (e.g., voice sample, video image, and the like), the identifying features may be compared with other similar features of the stored images, e.g., within a particular margin of error.

At decision block 310, the record provision application(s) 150 may determine whether a match between the identifying characteristics (e.g., image characteristics) and stored characteristics (e.g., at least one image among the stored users' images) is found. If a match is not found, at block 324 the record provision application(s) 150 may notify the requestor (e.g., application 140) that the match is not found. For example, an error message may be communicated to the application 140. If a match is found, at block 314 the record provision application(s) 150 may retrieve a record associated with the matched characteristics (e.g., image). As discussed above, the record may include one or more of a name of the individual, a telephone number of the individual, an email address of the individual, an address of the individual, and an expiration date of the record.

At block 318, the record provision application(s) 150 may verify the retrieved record using, e.g., a ranking associated with the record. As briefly described above, the ranking may be assigned to a record based on at least some of the following factors: a number of prior requests to obtain the individual's record, duration of storage of the individual's record in the contact directory 116, frequency and number of changes occurred (e.g., made by the individual) in the individual's record during the record's existence or during a particular time period, amount of data included in the record, and the like. Other factors may be included in a determination of a ranking of a record, such as, for example, permissions to share a record that may be set up by the user associated with the record, amount of data in the record that is allowed to be shared with other users, and other security and privacy settings associated with the ranking. The ranking factors may be assigned different weights, depending on importance of a particular factor relative to other factors.

The ranking of a record may be initially assigned, e.g., by the record provision application(s) 150 when the record is first added to the contact directory 116. The initial ranking value may be selected within a particular value range and/or may be based, at least in part, on the amount of information included in the initial record, for example. The ranking may be updated based, for example, upon occurrence of one or more factors, such as, if the record is added to a user's personal address book (e.g., address book 114), a frequency of the record updates, and the like.

For example, if a record of a particular (first) user is added to another (second) user's address book, a ranking of the record of the first user may increase, while a ranking of the record of the second user may decrease, at least temporarily, until the first user adds the record of the second user to her address book. At that point, the ranking of the record of the second user may be restored to its "pre-decrease" value. A temporary ranking decrease may reflect the fact that the second user may put her trust in the first user's record by adding the record to her personal address book. Once the trust is reciprocated by the first user adding the record of the second user to her address book, the ranking of the first user may increase.

Referring again to block 318, the retrieved record may be verified based on the assigned ranking. Generally, the higher the ranking, the higher the probability of the record verification. For example, if a ranking is determined to be above a verification threshold, the corresponding record may be considered verified. If the ranking is determined to be equal or below the verification threshold, the corresponding record may not be considered verified. In another example, if the ranking is determined to be a first verification threshold, but below a second verification threshold, the record may be considered tentatively verified, and the requestor may be informed about the tentative character of the record verification. For example, the record provision application(s) 150 may notify the requestor in a message associated with the provided record.

At decision block 322, the record provision application(s) 150 may determine whether the record has been verified. If the record has not been verified, at block 324 the record provision application(s) 150 may notify the requestor (e.g., application 140) that the record has not been verified. In some embodiments, an error message may be communicated to the application 140. In other embodiments, the unverified record may be provided to the requestor (e.g., application 140), for example, along with the ranking associated with the record. The user 160 of the device 120 may decide whether the record should be added to her address book 114. If the user 160 adds the unverified record to her address book 114, the ranking of the record may improve (e.g., increase by a determined value) and this in turn may improve the chances for successful verification of the individual 110's record in response to future requests for the individual's record.

If the record has been verified, at block 328 the record provision application(s) 150 may provide the record to the requestor (e.g., application 140). Information included in the record may be provided according to permission settings that may be defined by the individual whose record is being provided.

In some embodiments, the individual 110 may subscribe to the record search and verification service provided by the system 100 as described herein. The individual 110, while setting up her record for a contact directory 116 upon subscription, may select particular portions of the record that may be shared with other users. For example, the individual 110 may allow only her name to be shared with other users or her name and email address to be shared with other users, or the like. In some embodiments, at a minimum, a name of the individual may be provided with the record if the record is verified.

In some embodiments, the obtained features, such as an image of the individual may be also added to the individual's record stored in the contact directory 116, e.g., depending on permission settings provided by the individual and associated with the individual's record. Having an additional image added to the individual's record may enhance future image matches based on facial recognition as described in reference to block 306. For example, multiple photos taken by different cameras, under different conditions (lighting, clothing, etc.), can enhance the ability of automatic facial recognition to recognize an individual.

At block 332, the record provision application(s) 150 may update the ranking associated with the provided record. As described in reference to blocks 318 and 324, the ranking of the provided record may increase, e.g., by a determined value. The ranking of the record of the user 160, to whom the record has been provided, may also be updated. As described above, the ranking may decrease (at least temporarily) by a determined value.

Figure 4:
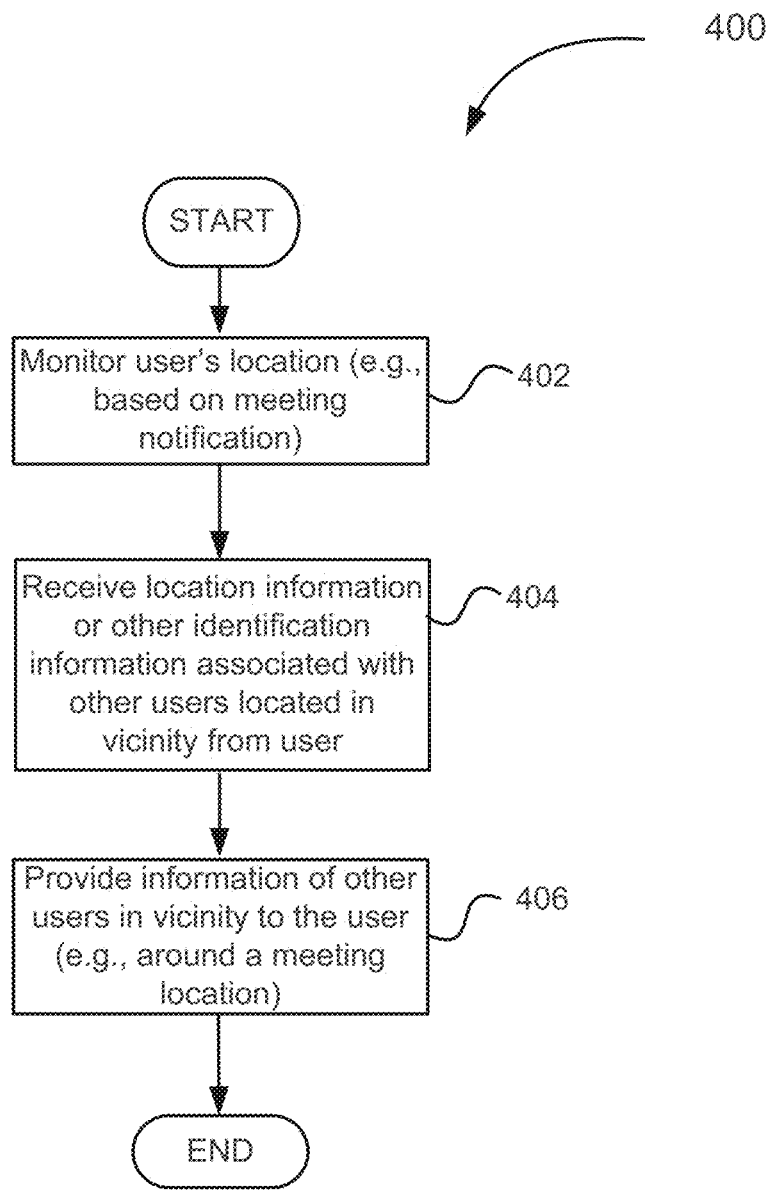
FIG. 4 is a process flow diagram illustrating a process for informing a user of a computing device about a presence of other users in vicinity of the computing device, in accordance with various embodiments.

FIG. 4 is a process flow diagram illustrating a process 400 for informing a user of a computing device about a presence of other users in vicinity of the computing device, in accordance with various embodiments. The process 400 may be performed, for example, by the record provision application(s) 150 executing on the application server 108 as described in reference to FIG. 1.

The process 400 may begin at block 402, where the record provision application(s) 150 may monitor user 160's location, based, e.g., on a Global Positioning System (GPS) location provided by the user 160's computing device 102. The user 160's location monitoring may be triggered by many different events. For example, the monitoring may begin when the computing device 160 is powered on. In another example, the monitoring may be triggered by a notification of an upcoming event that may be provided to the record provision application(s) 150 by the application 140 executing on the computing device 140. To continue with this example, the notification may be related to an upcoming meeting event at a particular location, where the user 160 may be joined by other users whose records may be stored in the user's address book 114 or in the contact directory 116.

At block 404, the record provision application(s) 150 may receive location information or other identification information associated with other users that are determined to be in vicinity, e.g., within a certain distance, from a location of the computing device 102. Continuing with the meeting example, the participants of an upcoming meeting may be identified to be within a particular distance from the user 160 operating a computing device 102, when the user 160 appears within a particular distance (e.g., 100 yards) the meeting location. In some embodiments, the computing device may detect the other users' presence within a particular distance, based, for example, on their proximity to the device 102. The detection may occur via a personal area network protocol, such as Bluetooth®, NFC, Wi-Fi, and the like. In some embodiments, the record provision application(s) 150 may receive the location information associated with the individual 110 by virtue of the user 160 capturing 112 the image of the individual 110.

At block 406, the record provision application(s) 150 may provide information of the users determined to be within a particular distance from the user 160, to the computing device 102. For example, the record provision application(s) 150 may list the names of the users determined to be within a particular distance from the device 102, such as names of the upcoming meeting participants, for example. In some embodiments, the users 124 and 126 may be notified of the presence of the individual 110 based on the user 160 capturing 112 the image of the individual 110 and subsequent adding the individual's record to the address book 114.

Figure 5:
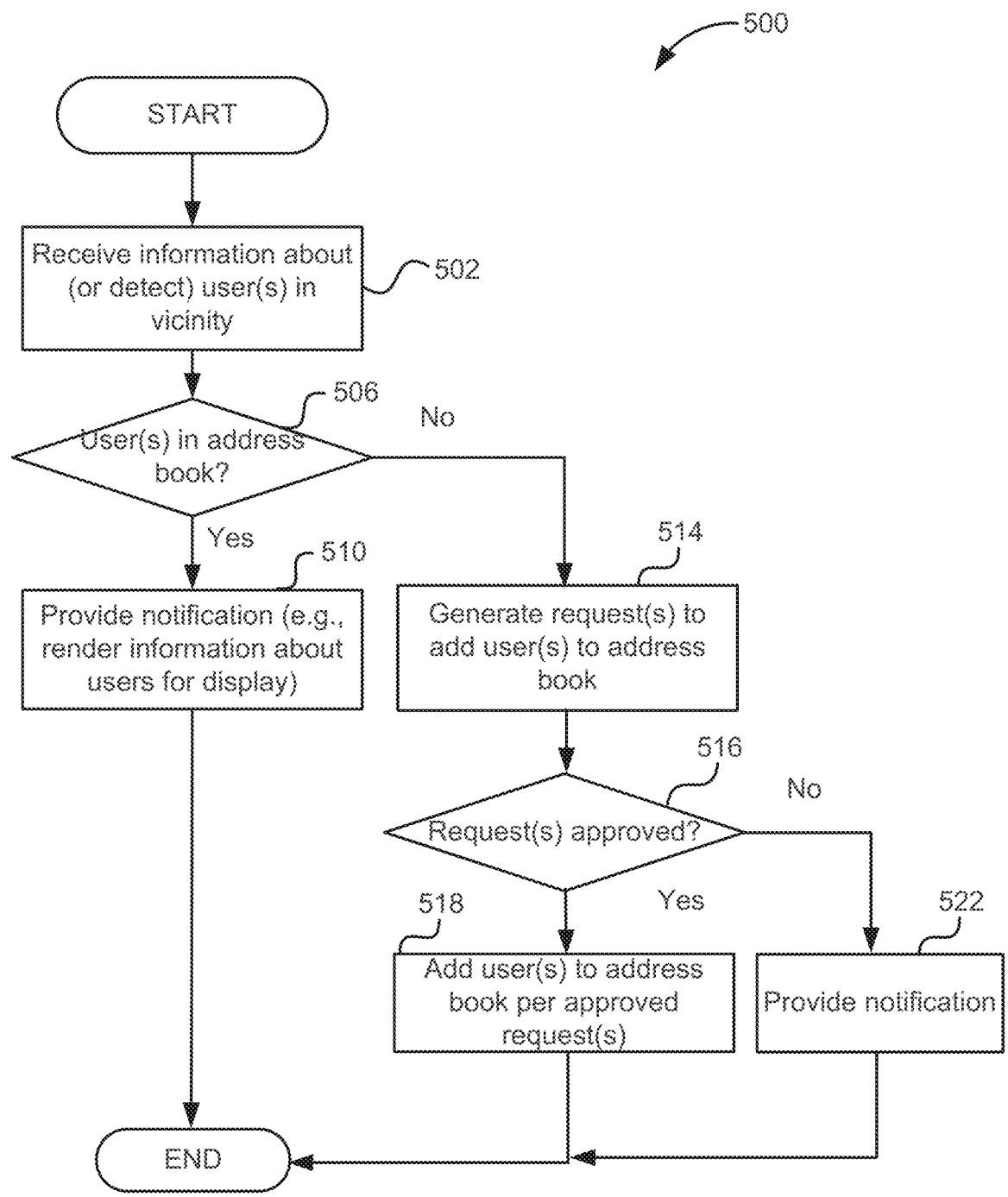
FIG. 5 is a process flow diagram illustrating another process for informing a user of a computing device about a presence of other users in vicinity of the computing device, in accordance with various embodiments.

FIG. 5 is a process flow diagram illustrating a process 500 for informing a user of a computing device about a presence of other users in vicinity of the computing device, in accordance with various embodiments. The process 500 may be performed, for example, by the application 140 executing on the computing device 102 as described in reference to FIG. 1.

The process 500 may begin at block 502, where the application 140 may receive information about, or detect the presence of the other users identified as being in vicinity of the computing device 102 as described above in reference to FIG. 4. At decision block 506, the application 140 may determine whether the records of identified users are in the user 160's address book 114. If the records of identified users are determined to be in the address book 114, the application 140 may render information (e.g., names) of the identified users for display on the computing device 102. In some embodiments, only the users with records stored in the address book 114 may be detected in vicinity of the computing device 102. Accordingly, continuing with the example of a meeting event described in reference to FIG. 4, the user 160 may be reminded of the names of people she is supposed to meet.

If the identified users' records are determined to be absent in the address book 114, the identified users may have their records stored at the contact directory 116, otherwise their identification may not have been possible. Accordingly, at block 514 the application 140 may communicate messages to the identified users requesting that the users' records that are stored at the contact directory 116 be allowed to be added to the address book 114.

In some embodiments, the users whose records may be in the contact directory 116, but not in the address book 114, may be identified (or requested to be identified) if the user 160 of the device 102 obtains an image (e.g., takes the picture) of such user or users (e.g., users 124 and/or 126). For example, a request to add the record may be sent to the user or users whose image has just been obtained by the device 102. Accordingly, the privacy concerns that random users whose records are stored in the contact directory 116 are identified as being in vicinity of the device 102 may be eliminated.

At decision block 516, the application 140 may determine whether the requests have been approved. If at least some of the requests to add users' records have been approved by the users, the application 140 may add the users' records to the address book 114 at block 518. If at least some of the requests to add users' records have not been approved by the users, the application 140 may notify the user 160 of the computing device 102 that the requests have not been approved, at block 522.

As discussed above, in some embodiments, the users' records may be added to the address book based on the permissions to share information in the records that were set by the users. For example, a user may provide a setting associated with her record stored at the contact directory 116 that may specify that the record or portion thereof may be added to another user's personal address book without an explicit approval by the user. In this case, the requests to add the users' records generated at block 514 may be directed to the record provision application(s) 150 executing on the application server 108. The record provision application(s) 150, upon checking the appropriate settings, may retrieve and provide the requested records in response to the requests.

Figure 6:
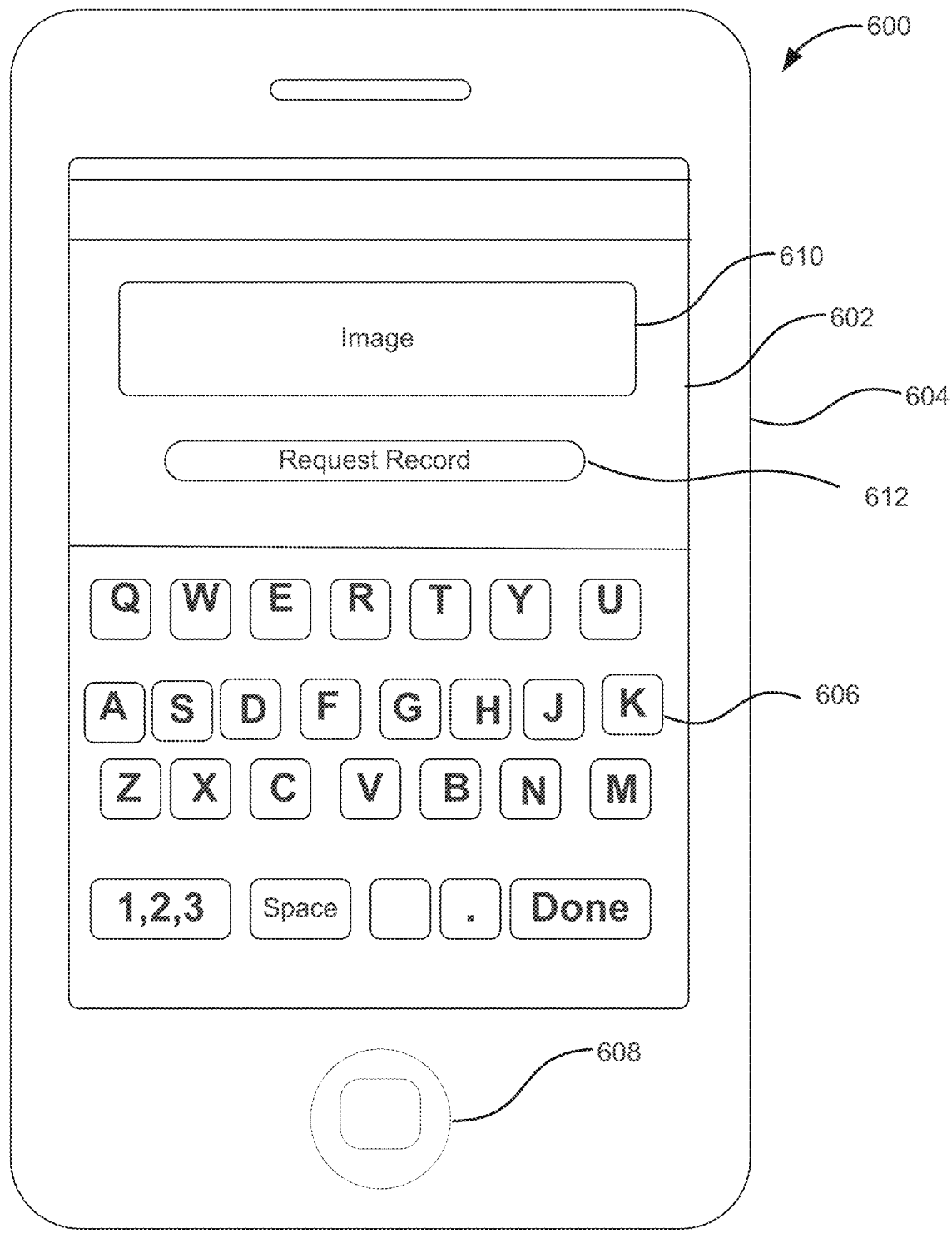
FIGS. 6 and 7 illustrate screenshots of example user interfaces for provisioning a user record associated with an image.
Figure 7:
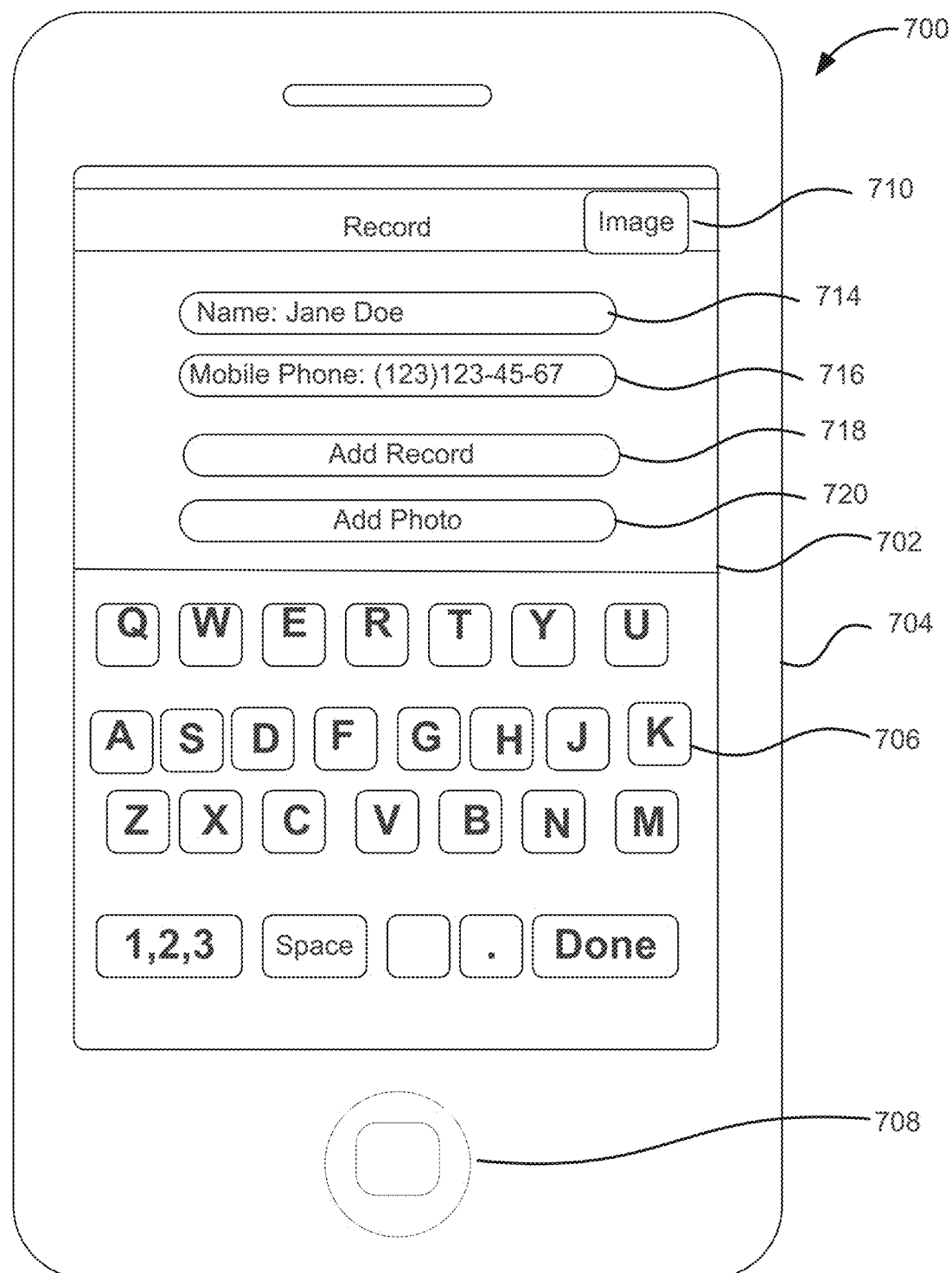

FIGS. 6 and 7 illustrate screenshots of example user interfaces 600 and 700 for provisioning a user record associated with an image described in reference to FIGS. 1-5. In some embodiments, the user interfaces 600 and 700 may be provided by the application 140 executing on the computing device 102. The user interfaces illustrated in FIGS. 6 and 7 should be interpreted as in no way limiting and are shown for illustrative purposes only.

FIG. 6 illustrates a user interface 600 configured to request a search for a record associated with an image of an individual based on an image of the individual as described in reference to FIGS. 1 and 3. Referring to FIG. 6, the user interface 600 may be displayed on a display screen 602 of a mobile wireless device 604. In some embodiments, the display screen 602 may be a touch-sensitive screen. The mobile wireless device 604 may also include a keyboard 606 that may be embedded in the device 604 or rendered on the display screen 602 if the screen is touch-sensitive. The mobile wireless device 604 may also include one or more control buttons 608.

As shown, the user interface 600 may include an image 610 (e.g., image of the individual 110) captured or otherwise obtained as described in reference to FIG. 1. The user interface 600 may further include a selectable element 612 that may be selected by the user via a touch or using a cursor, a stylus, or any other known method. The selectable element 612, when selected, may cause the device to provide a request for search and verification of a record associated with an image matching the image 610, if found. It will be appreciated that other user interface elements may be added to the interface 600 (or removed therefrom) in order to implement the techniques described herein, as needed.

FIG. 7 illustrates a user interface 700 configured to provide to the user a record obtained in response to the request communicated via the interface 600 as described in reference to FIGS. 6, and to add the record to an address book of the user of the computing device (e.g., a wireless mobile device 704), as described in reference to FIGS. 1 and 2. Referring to FIG. 7, the user interface 700 may be displayed on a display screen (e.g., a touch-sensitive screen) 702 of a mobile wireless device 704. Similar to the device 604 shown in FIG. 6, the mobile wireless device 704 may include a keyboard 706 and one or more control buttons 708. The user interface 700 may include an image 710 (e.g., a copy of the image 610 of the individual 110) captured or otherwise obtained as described in reference to FIG. 1.

The user interface 600 may further include one or more user interface elements 714, 716, 718, and 720 (e.g., windows, icons, buttons, and the like). Some elements may be configured to be selectable by the user (in the illustrated example, elements 718 and 720). As shown, elements 714 and 716 may display at least a portion of the record of the individual 110 provided e.g., by the record provision application(s) 150 in response to the request for information initiated as described in reference to FIG. 6. While the illustrated elements display the name (Jane Doe) and the telephone number ((123)123-4567) of the individual, additional elements may be employed to render other portions of the record, if permitted by the individual 110 as described above. At a minimum, an individual's name may be returned with the individual's record, if found and verified by the record provision application(s) 150 as described above.

Elements 718 and 720 may be selectable and may offer options to the user to add the provided record to the user's address book (718), and/or to add the image 710 of the individual to the user's address book (720). In some embodiments, the image 710 of the individual may be also added to the individual's record stored in the contact directory 116, if permitted by the individual.

It will be appreciated that other user interface elements may be added to the interface 700 (or removed therefrom) in order to implement the techniques described herein, as needed. For example, the element 718 "Add record" may be supplemented with another element (not shown), asking the user to send a request to the individual for approval of her record to be added to the user's address book. In another example, the element 718, when selected, may trigger such approval request to be communicated to the individual. In still another example, the element 718, when selected, may cause the record portions 714 and 716 to be added to the address book, depending on permissions set up by the individual whose record is being added, as described above.

Figure 8:
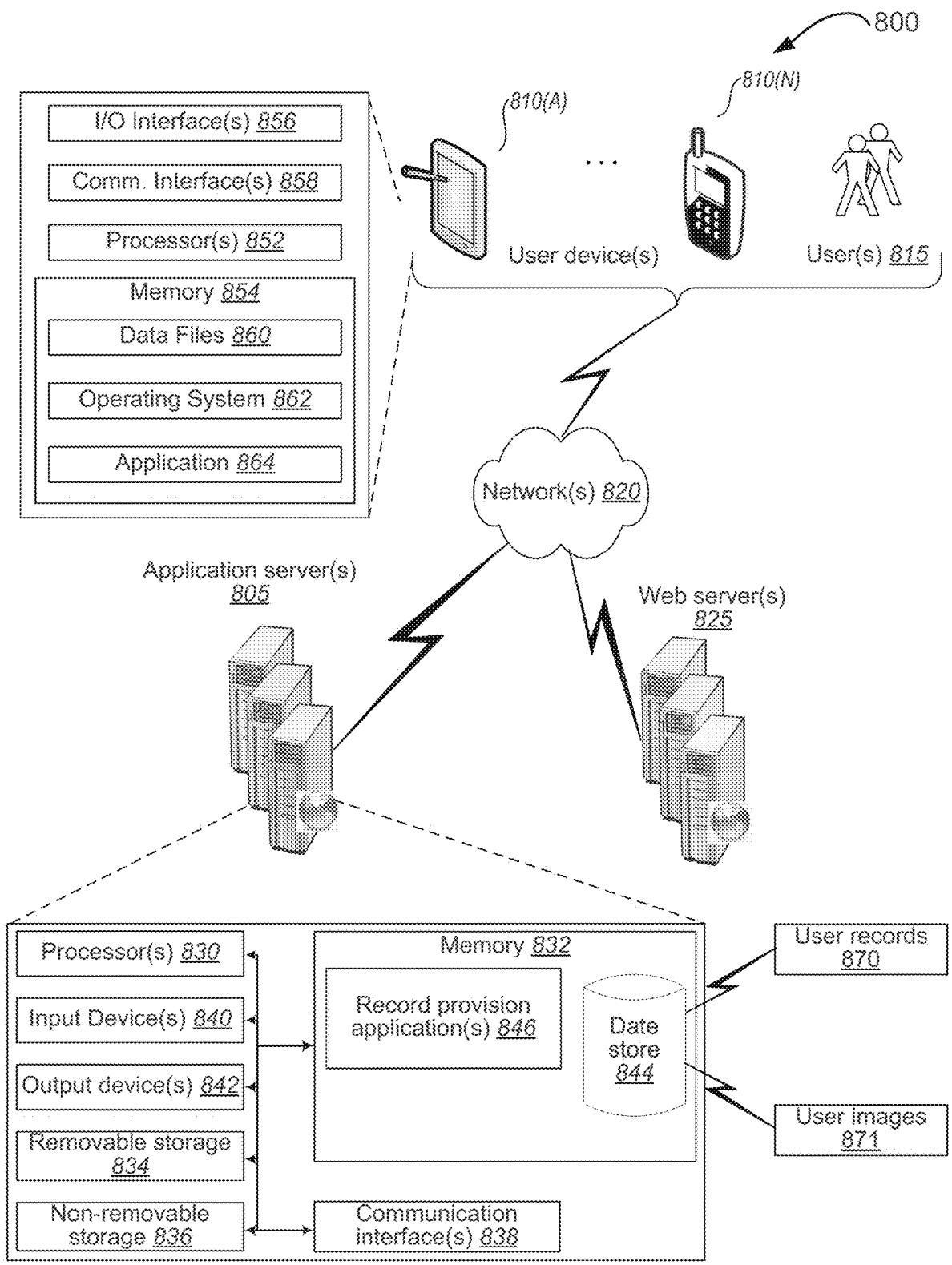
FIG. 8 illustrates an example computing environment in which embodiments described in the present disclosure may be implemented in accordance with various embodiments.

FIG. 8 illustrates an example of an environment 800 for implementing aspects in accordance with various embodiments. As will be appreciated, although a Web-based environment is used for purposes of explanation, different environments may be used, as appropriate, to implement various embodiments. The environment 800 may include one or more electronic computing devices 810(A)-810(N), which may include any appropriate device operable to send and receive requests, messages, or information over an appropriate network 820 and convey information back to a user 815 of the device, such as the device 102 described in greater detail in reference to FIGS. 1-7. Examples of such computing devices may include smartphones, personal computers, cell phones, handheld messaging devices, laptop computers, set-top boxes, personal data assistants, electronic book readers, tablets computers, and the like. The computing devices 810(A)-810(N) may include a processor 852 and memory 854 for storing processor-executable instructions, such as data files 860, operating system 862, and one or more applications 864, such as application 140 described in reference to FIG. 1. The operating system 862 may be a general purpose operating system such as a Microsoft Windows® operating system, a UNIX® operating system, a Linux® operating system, or an operating system specifically written for and tailored to the computing devices 810(A)-810(N).

The devices 810(A)-810(N) may further include at least one or both of the following elements: input/output interface 856 and communication interface 858. The communication interface 858 may enable the computing devices 810(A)-810(N) to communicate data, control signals, data requests, and other information with other resources including computers, data sources, storage devices, and the like, on a computer network 820 such as the Internet, via wired or wireless connections. The input/output interface 856 may enable the computing devices 810(A)-810(N) to obtain data input from a variety of devices including, but not limited to, a digital pen, a touch screen, a keyboard, a mouse, a scanner, and the like. In addition to the illustrative components described above, a display interface (not shown) may be used for outputting display information to a computer user. Typically, the display information may be outputted by the display interface via a display device (e.g., a CRT monitor, an LCD screen, a touch screen, a television, an integrated screen or sets of screens, etc.).

The network 820 may include any appropriate network, including an intranet, the Internet, a cellular network, a local area network, a personal network, or any other such network or combination thereof. Components used for such a system can depend at least in part upon the type of network and/or environment selected. Protocols and components for communicating via such a network are well known and will not be discussed herein in detail. Communication over the network may be enabled by wired or wireless connections, and combinations thereof.

The memory 854 may generally comprise RAM, ROM, and/or other permanent memory. Thus, in addition to storage in read/write memory (RAM), programming instructions may also be embodied in read-only format, such as those found in ROM or other permanent memory.

The illustrative environment 800 may include at least one application server 805 including, or associated with, one or more processors 830, input devices 840, output devices 842, removable storage 834, and non-removable storage 836 that may be connected to a communication interface 838 and memory 832. The memory 832 may include, but is not limited to, record provision application(s) 846 similar to the application(s) 150 described above in reference to FIG. 1.

The memory 832 may further include a data store 844 configured to store user images 871 and record information 870 as described above in reference to the contact directory 116 of FIG. 1. As used herein, the term "data store" may refer to any device or combination of devices capable of storing, accessing, and retrieving data, which may include any combination and number of data servers, databases, data storage devices, and data storage media, in any standard, distributed, or clustered environment. It should be understood that there may be many other aspects that may need to be stored in the memory 832, such as page image information or access right information, which may be stored in any of the above-listed mechanisms as appropriate.

The application server 805 may include any appropriate hardware and software for integrating with the data store 844 as needed to execute aspects of one or more applications for the computing devices 810(A)-810(N), handling a majority of the data access and business logic for an application. The application server 805 may provide access control services in cooperation with the data store 844, and is able to generate content such as text, graphics, audio, and/or video to be transferred to a viewer, which may be served to the viewer by the Web server in the form of HTML, XML, or another appropriate structured language in this example. The handling of all requests and responses, (e.g., requests for user records and the records provided in response) as well as the delivery of content between the computing devices 810(A)-810(N) and the application server 805, may be handled by the content provider Web server(s) 825.

It should be understood that the Web and application servers 805 and 825 are not required and are merely example components, as the applications discussed herein may be executed on any appropriate device or host machine as described elsewhere herein. Each server 805 or 825 may include an operating system that may provide executable program instructions for the general administration and operation of that server, and may include a computer-readable medium storing instructions that, when executed by a processor (e.g., 830) of the server, may allow the server to perform its intended functions. Suitable implementations for the operating system and general functionality of the servers are known or commercially available, and are readily implemented by persons having ordinary skill in the art, particularly in light of the disclosure herein.

The environment 800 may include a distributed computing environment utilizing several computer systems and components that may be interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature, and not limited to the scope of the disclosure.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, limited only by the claims.

The invention claimed is:

1. A computer-implemented method, comprising:
receiving, by a first computing device from a second computing device, voice data comprising a digital representation of speech associated with a first record, the voice data comprising first identifying acoustic characteristic data;

determining, by the first computing device, that the first identifying acoustic characteristic data matches second identifying acoustic characteristic data stored in a memory in association with the first record;

determining first data associated with the first record, the first data representing personal information about a user associated with the first record;

detecting a user device located in a vicinity of the second computing device; and sending, by the first computing device to the user device, content associated with the first data.

2. The computer-implemented method of claim 1, further comprising:

determining first location data associated with the first record;

determining, by the first computing device, second location data associated with a second record, the second location data indicating that a third computing device associated with the second record is within a first distance from the second computing device;

determining second content related to the second location data; and sending the second content to the second computing device.

3. The computer-implemented method of claim 1, further comprising:

sending location data associated with the user device to the second computing device.

4. The computer-implemented method of claim 1, further comprising:

determining permission data associated with the first record; and sending the content associated with the first data to the second computing device based at least in part on the permission data.

5. The computer-implemented method of claim 1, further comprising:

generating an updated contact directory with the first data associated with the first record, wherein the first data associated with the first record comprises at least one of a name of the user associated with the first record or a telephone number of the user associated with the first record.

6. The computer-implemented method of claim 5, further comprising:

updating the updated contact directory to include an expiration date associated with the first data in the updated contact directory.

7. The computer-implemented method of claim 1, further comprising:

determining a first ranking of the first data, wherein the first ranking is assigned to the first data based on at least one of: a number of requests to obtain the first data, a duration of storage of the first data, a number of changes to the first data during the duration of storage, or an amount of data included in the first data.

8. The computer-implemented method of claim 1, further comprising:

detecting a second user located in a vicinity of the second computing device; and determining that an address book record in a contact directory of the second computing device is associated with the second user located in the vicinity of the second computing device.

9. A system comprising:

at least one processor; and non-transitory computer-readable memory storing instructions that, when executed by the at least one processor, are effective to:

receive, from a first computing device, voice data comprising a digital representation of speech associated with a first record, the voice data comprising first identifying acoustic characteristic data;

determine that the first identifying acoustic characteristic data matches second identifying acoustic characteristic data stored in a memory in association with the first record;

determine first data associated with the first record, the first data representing personal information about a user associated with the first record;

detect a user device located in a vicinity of the first computing device; and send, to the user device, content associated with the first data.

10. The system of claim 9, the non-transitory computer-readable memory storing further instructions that, when executed by the at least one processor, are further effective to:

determine first location data associated with the first record;

determine second location data associated with a second record, the second location data indicating that a third computing device associated with the second record is within a first distance from the first computing device;

determine second content related to the second location data; and send the second content to the first computing device.

11. The system of claim 9, the non-transitory computer-readable memory storing further instructions that, when executed by the at least one processor, are further effective to:

send location data associated with the user device to the first computing device.

12. The system of claim 9, the non-transitory computer-readable memory storing further instructions that, when executed by the at least one processor, are further effective to:

determine permission data associated with the first record; and send the content associated with the first data to the first computing device based at least in part on the permission data.

13. The system of claim 9, the non-transitory computer-readable memory storing further instructions that, when executed by the at least one processor, are further effective to:

generate an updated contact directory with the first data associated with the first record, wherein the first data associated with the first record comprises at least one of a name of the user associated with the first record or a telephone number of the user associated with the first record.

14. The system of claim 13, the non-transitory computer-readable memory storing further instructions that, when executed by the at least one processor, are further effective to:

update the updated contact directory to include an expiration date associated with the first data in the updated contact directory.

15. The system of claim 9, the non-transitory computer-readable memory storing further instructions that, when executed by the at least one processor, are further effective to:
  determine a first ranking of the first data, wherein the first ranking is assigned to the first data based on at least one of: a number of requests to obtain the first data, a duration of storage of the first data, a number of changes to the first data during the duration of storage, or an amount of data included in the first data.

16. The system of claim 9, the non-transitory computer-readable memory storing further instructions that, when executed by the at least one processor, are further effective to:
  detect a second user located in a vicinity of the first computing device; and
  determine that an address book record in a contact directory of the first computing device is associated with the second user located in the vicinity of the first computing device.

17. A system comprising:
  a first computing device; and
  a second computing device;
  wherein the first computing device is configured to:
    receive, from the second computing device, voice data comprising a digital representation of speech associated with a first record, the voice data comprising first identifying acoustic characteristic data;
    determine that the first identifying acoustic characteristic data matches second identifying acoustic characteristic data stored in a memory in association with the first record;
    determine first data associated with the first record, the first data representing personal information about a user associated with the first record;
    detect a user device located in a vicinity of the second computing device; and
    send, to the user device, content associated with the first data.

18. The system of claim 17, wherein the first computing device is further configured to:
  determine first location data associated with the first record;
  determine second location data associated with a second record, the second location data indicating that a third computing device associated with the second record is within a first distance from the second computing device;
  determine second content related to the second location data; and
  send the second content to the second computing device.

19. The system of claim 17, wherein the first computing device is further configured to:
  send location data associated with the user device to the second computing device.

20. The system of claim 17, wherein the first computing device is further configured to:
  determine permission data associated with the first record; and
  send the content associated with the first data to the second computing device based at least in part on the permission data.

* * * * *